June 26, 1956  J. C. LINK ET AL  2,752,594
RADAR REFLECTOR
Filed March 19, 1953
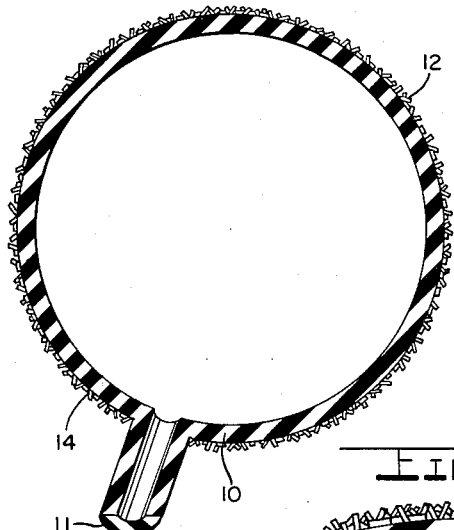
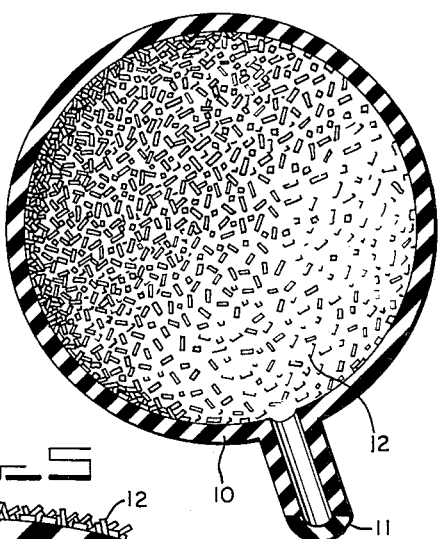
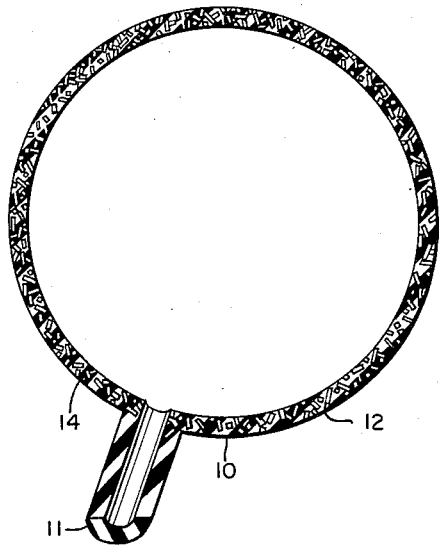
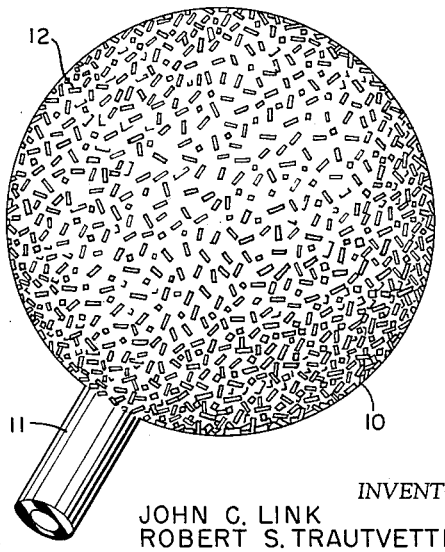
INVENTORS
JOHN C. LINK
ROBERT S. TRAUTVETTER
BY
ATTORNEYS United States Patent Office 2,752,594
Patented June 26, 1956

2,752,594

RADAR REFLECTOR

John C. Link, District Heights, Md., and Robert S. Trautvetter, Washington, D. C., assignors to the United States of America as represented by the Secretary of the Navy Application March 19, 1953, Serial No. 343,532

7 Claims. (Cl. 343—18)

(Granted under Title 35, U. S. Code (1952), sec. 266)

This invention relates to radar reflectors that are especially adaptable for use as meteorological devices.

Previous attempts to utilize radio frequency energy reflectors to obtain meteorological data have envisioned the use of rubber-like balloons partially encased in a material capable of reflecting radio frequency energy. In order for the material to remain on the balloon, more than half the surface area of the balloon is required to be encased. This limits the amount of volume expansion of the balloon to the expansion of the casing, which is considerably less than that of the balloon itself. Therefore, the maximum altitude such a balloon can attain is limited. Consequently, wind velocities capable of being measured at high altitudes by the conventional theodolite method during periods of good visibility can only be obtained at lower altitudes in any kind of weather using such a type of balloon and radar equipment.

Another prior art device utilizes corner reflectors associated with a conventional meteorological balloon. A disadvantage of this type of device is that if the balloon rotates in flight, a non-uniform echo is received at the radar tracking station. Therefore, there is a good possibility that the balloon may be lost in flight, thus resulting in incomplete meterological data being obtained. Other disadvantages of this type of balloon include the extreme fragility of the corner reflectors and the fact that they are rather expensive to produce.

Another prior art device embodies a hemispherical balloon mounted on an equatorial plane surface of radio frequency energy reflective material with vanes extending from the outer surface of the balloon. These vanes cause the balloon to rotate upon rising in the atmosphere, thereby causing the reflective material surface to remain on the bottom of the balloon. This device also fails to attain the maximum altitudes obtainable by the balloons normally used in conjunction with theodolites.

It is, therefore, an object of this invention to provide an improved radar reflector.

It is another object to provide a radar reflector that returns a uniform intensity echo to a source at a given range no matter what the rotational position of the reflector may be.

Another object of this invention is to provide a meteorological balloon capable of use in all types of weather conditions wherein the altitude limitations inherent in prior art devices of this type are minimized.

Still another object of this invention is to provide an improved meteorological balloon that is inexpensive to manufacture and as sturdy as the balloon itself.

Other objects of this invention will become apparent from a study of the following specification taken in connection with the attached drawings. It is to be understood, however, that the disclosure contained herein describes a typical embodiment of the invention and that the scope of the invention is not limited to this embodiment, but to the claims appended hereto.

Reference is now had to the accompanying drawings wherein

Figure 1 represents a cross-sectional view of one embodiment of my invention,

Figures 2 and 3 are views similar to Figure 1 of a second and third embodiment of my invention, respectively, Figure 4 is a perspective view of the embodiment shown in Figure 1, Figure 5 is an enlarged cross-sectional view of a portion of the embodiment shown in Figure 1.

This invention envisions attaching a plurality of small metallic resonant dipole elements on a surface of a conventional meteorological balloon in sufficient quantities to have these dipole elements present a substantially nondirectional reflective surface to radio frequency energy. These dipole elements can be attached to either the exterior or the interior surface of the balloon by means of a non-rigid yielding or fluid adhesive cementitious material.

Referring now specifically to Figures 1 and 4, a meteorological balloon 10 of non-metallic material such as rubber and polethylene, for example, is provided with an inlet port 11 and a plurality of metallic elements 12 on its outer surface. These elements are oriented with respect to the surface of the balloon in a random manner as shown in Figure 4 and are attached to the balloon 10 by means of a yielding cementing material 14 such as liquid latex or other "rubber" cement. Metallic elements 12 are preferably so dimensioned that their longest dimension equals approximately a half wavelength of the frequency transmitted by a radar transmitter, thereby enabling the metallic elements to behave as dipoles. For example, for use with 3 cm. wavelength energy, metallic elements 12 should be 1.5 cm. in length. However, while the use of metallic elements 12 as dipoles is preferable, results can be obtained if enough metallic particles are attached to the balloon to enable the balloon to act as a substantially spherical reflective surface regardless of the wavelength used.

The embodiment of Figure 1 may be manufactured by spraying the cementitious material on the outer surface of the balloon and then applying the metallic particles to the cementitious material.

The embodiment of Figure 2 is similar to that of Figure 1 except that the metallic particles 12 adhere to the inner surface of the balloon 10. This embodiment may be made by either direct application of the metallic particles to a cementitious coating 14, for example, a low freezing point, low surface tension liquid such as soap and water or permanent antifreeze fluids, applied on the internal surface of the balloon through the inlet port 11 or by application of the metallic particles to a cementitious coating on the out surface of the balloon and reversing the balloon.

In Figure 3, application of additional liquid cement is made on the surface upon which the metallic particles 12 are applied so that the finished product is a balloon having a multiplicity of metallic particles oriented at random within a rubber or other elastomeric medium.

In a typical practical embodiment of the present invention, a balloon originally inflated to a diameter of 5 feet at a ground station and which is to be tracked by a radar transmitter transmitting 3 cm. wave energy is equipped with about 100,000 particles of metal foil, for example, aluminum. Each of these particles has a length of approximately 1.5 cm., thereby enabling it to act as a dipole reflector. The other dimensions are made as small as possible. Each of these particles are sprayed on so that they individually adhere to the balloon but not to each other. Thus, the normal expansion of the balloon as it rises is not impeded. The bursting point of the balloon as it expands upon rising determines the maximum altitude at which it can be tracked. The weight of the metallic particles is negligible compared to that of the balloon so that it does not appreciably affect the maximum altitude attainable by the balloon, since the amount of expansion of the balloon depends upon the outside pressure of the atmosphere. Since only a few ounces of weight are added to conventional balloons by the addition of the dipoles compared to large additional weights inherent in prior art devices, the rate of rise of the present device is substantially unimpeded. Hence, higher altitudes can be studied for any given maximum range at which echoes are obtainable. The metallic particles do not appreciably affect the bursting point of the balloon. Therefore, the balloon embodied in the present invention is able to rise to levels comparable with that reached by conventional meteorological balloons and since it can be tracked by radar devices, is not limited in its operation to periods of good visibility.

While optimum results are obtained using dipole elements having lengths such as to enable them to resonate at the frequency of the energy to be reflected, namely, approximately a half-wave length, echoes can be obtained from non-resonant lengths of metal foil. However, it is preferable for best results to have the dipole length such that it will resonate. This enables the range at which reflections are obtained by an observer tracking the balloon by radar to be increased to a maximum.

The invention described herein may be manufactured and used by or for the Government of the United States of America for governmental purposes without the payment of any royalties thereon or therefor.

What is claimed is:

1. An electromagnetic energy reflecting device, comprising a non-metallic balloon having a multitude of discrete metallic elements of small surface area compared to that of the balloon adhered to the wall of said balloon by a non-rigid yielding material.

2. A non-metallic balloon having a multitude of metallic particles having a small surface area compared to that of the balloon attached to the outer surface of said balloon by means of a non-rigid yielding material.

3. A non-metallic balloon having a multitude of discrete metallic elements having a small surface area compared to that of the balloon attached to the inner surface of said balloon by means of a non-rigid yielding material.

4. A non-metallic expandable two layer balloon having a multitude of metallic particles having a small surface area compared to that of the balloon cementitiously sandwiched between the layers of the balloon by means of a non-rigid yielding material.

5. A radio frequency energy reflector comprising a non-metallic balloon, and a plurality of uniformly distributed dipole elements adhered to the wall of said balloon by a non-rigid yielding material.

6. A radio frequency energy reflector comprising a non-metallic balloon, a plurality of dipole elements adhered to the wall of said balloon by a non-rigid yielding material, said dipole elements being filamentous in shape and having a length substantially equal to half the wavelength of radio frequency energy to be reflected.

7. A device for use in obtaining meteorological data comprising a non-metallic, inflatable balloon having an expandable wall, a plurality of uniformly distributed discrete metallic elements carried by the inner surface of said wall and fluid means for cementitiously maintaining the metallic elements in association with said expandable wall.

References Cited in the file of this patent
UNITED STATES PATENTS

| | | |
|---|---|---|
| 2,151,336 | Scharlau | Mar. 21, 1939 |
| 2,455,469 | Caspar | Dec. 7, 1948 |
| 2,619,303 | Martin | Nov. 25, 1952 |

OTHER REFERENCES

"Electronics," January 1946, pages 92–97.